(12) United States Patent
Seth et al.

(10) Patent No.: US 12,222,899 B2
(45) Date of Patent: Feb. 11, 2025

(54) SMART CONTENT LOAD

(71) Applicant: DocuSign, Inc., San Francisco, CA (US)

(72) Inventors: Timothy Seth, Chinnor (GB); Mark Rollins, Oxford (GB)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 17/950,330

(22) Filed: Sep. 22, 2022

(65) Prior Publication Data
US 2024/0104054 A1  Mar. 28, 2024

(51) Int. Cl.
| | |
|---|---|
| *G06F 16/00* | (2019.01) |
| *G06F 16/16* | (2019.01) |
| *G06F 21/60* | (2013.01) |
| *G06F 21/62* | (2013.01) |
| *G06F 40/205* | (2020.01) |
| *G06N 5/022* | (2023.01) |
| *G06V 30/19* | (2022.01) |
| *G06V 30/412* | (2022.01) |
| *G06V 30/416* | (2022.01) |

(52) U.S. Cl.
CPC ............ *G06F 16/16* (2019.01); *G06F 21/602* (2013.01); *G06F 21/6218* (2013.01); *G06F 40/205* (2020.01); *G06N 5/022* (2013.01); *G06V 30/191* (2022.01); *G06V 30/412* (2022.01); *G06V 30/416* (2022.01)

(58) Field of Classification Search
CPC .... G06F 16/16; G06F 21/602; G06F 21/6218; G06F 40/205; G06N 5/022; G06V 30/191; G06V 30/412; G06V 30/416

USPC .................................................. 707/600–899
See application file for complete search history.

(56) References Cited

U.S. PATENT DOCUMENTS

| | | | |
|---|---|---|---|
| 2009/0144734 A1* | 6/2009 | Diez ......................... | G06F 9/50 718/100 |
| 2012/0102005 A1 | 4/2012 | Kamei | |
| 2015/0074115 A1 | 3/2015 | Vasu | |
| 2015/0278338 A1 | 10/2015 | Heard | |
| 2017/0316078 A1 | 11/2017 | Funke | |
| 2018/0210763 A1* | 7/2018 | Kumar .................. | G06F 9/5077 |

(Continued)

OTHER PUBLICATIONS

International Search Report and Written Opinion for International Application No. PCT/US2023/033265, mailed on Feb. 15, 2024, 12 pages.

*Primary Examiner* — Irete F Ehichioya
*Assistant Examiner* — Shirley D Hicks
(74) *Attorney, Agent, or Firm* — KDW Firm PLLC

(57) ABSTRACT

A system and a method are disclosed for automatic content upload and process. The system retrieves a set of files from a source location based on instructions received from a client device of a user. The system then classifies the set of files into a plurality of categories corresponding to a sequence of one or more services configured to process or store files. The system then generates a data structure storing key values, where the key values are derived based on respective processing of subsets of files. Responsive to receiving an input to execute logic relating to the set of files, the system determines that the input is associated with one or more of the key values, retrieves the one or more of the key values, and executing the logic using the one or more retrieved key values.

20 Claims, 8 Drawing Sheets

(56) References Cited

U.S. PATENT DOCUMENTS

| | | | |
|---|---|---|---|
| 2020/0082261 A1* | 3/2020 | Silberman | G06N 20/20 |
| 2020/0234183 A1 | 7/2020 | Ghatage | |
| 2021/0350009 A1 | 11/2021 | Freundlich | |
| 2024/0037067 A1* | 2/2024 | Nyamagouda | G06F 16/13 |

* cited by examiner

800

Retrieve a set of files from a source location based on instructions received from a client device of a user
805

Classify the set of files into a plurality of categories corresponding to a plurality of channels, each of the plurality of channels comprising a sequence of one or more services configured to process or store files
810

Generate a data structure storing key values, the key values derived based on respective processing of subsets of files processed by different ones of the channels
815

Receive an input to execute logic relating to the set of files
820

Determine that the input is associated with one or more of the key values
825

Retrieve the one or more of the key values
830

Execute the logic using the one or more retrieved key values
835

FIG. 8

SMART CONTENT LOAD

TECHNICAL FIELD

The disclosure generally relates to an online document system, and more specifically to an online document system configured to intelligently orchestrate different types of documents to different channels for further processing.

BACKGROUND

An online document system can enable entities to upload and store their documents in cloud storage. Such entities may include (but are not limited to) contract managers, compliance entities, and/or legal entities that retain a large amount of paperwork or documents. Once the documents are uploaded, the entities often need to further process the documents depending on the types of the documents. For example, certain PDF files may require optical character recognition (OCR). As another example, data sheets, such as spreadsheet files, may require other types of processing, such as generating indexes for easy search. Some existing systems allow users to manually select a post-processing action for each document. Alternatively, users are required to create custom code, and the documents are processed based on the custom code.

Further, entities may have voluminous historical documents that need to be backed up and indexed in the cloud storage. Such historical documents are often not categorized or generated systematically as recent documents. To make sure the historical documents are processed properly, additional manual reviews or manual categorizations may be required. However, different users may manually categorize documents into different categories, creating confusing and inconsistent user experiences. Additionally, manually performing these post-processing actions is repetitive and time-consuming, and human errors may cause inadequate file conversion or transformation being performed, while implementing an automated system is costly for entities.

SUMMARY

An online document system (also referred to as a smart content load service, or a document processing service) described herein allows for the automation of processing actions performed on a plurality of types of files and generating key values based on the processing actions. The key values can be easily queried and operated on, such that users can quickly and conveniently obtain information contained in the files and/or execute logic relating to the files. The files may be received from a local storage of a client device and/or a cloud storage associated with an entity. The files may be received individually or in bulk.

In some embodiments, the online document system retrieves a set of files from one or more source locations based on instructions received from a client device of a user, and classifies the set of files into a plurality of categories corresponding to a plurality of channels. Each of the plurality of channels includes a sequence of one or more services configured to process or store files.

For example, in some embodiments, the plurality of channels may include an AI channel and a non-AI channel. In some embodiments, the AI channel may include an OCR processor configured to recognize text from a PDF file or an image file.

In some embodiments, the online document system is configured to derive key values based on respective processing of subsets of files processed by different ones of the processing channels, and store the key values in a data structure. The key values stored in the data structure can then be used to execute logic. Responsive to receiving an input to execute logic relating to the set of files, the online document system is configured to determine that the input is associated with one or more of the key values, retrieves the one or more of the key values, and executes the logic using the one or more retrieved key values.

In some embodiments, the online document system is further configured to monitor workload or processing speed of each of the plurality of channels, and automatically scales up a particular channel in the plurality of channels based in part on the workload or processing speed of the particular channel. In some embodiments, scaling up the particular channel includes adding a new channel that performs same processing as the particular channel to simultaneously process a same category of files. In some embodiments, scaling up the particular channel includes allocating additional hardware resources to the particular channel, allowing the particular channel to have a greater processing power.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 8 is a flowchart illustrating a process for automatic content upload and process.

The figures depict various example embodiments of the present technology for purposes of illustration only. One skilled in the art will readily recognize from the following description that other alternative embodiments of the structures and methods illustrated herein may be employed without departing from principles of the technology described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture

Figure 1:
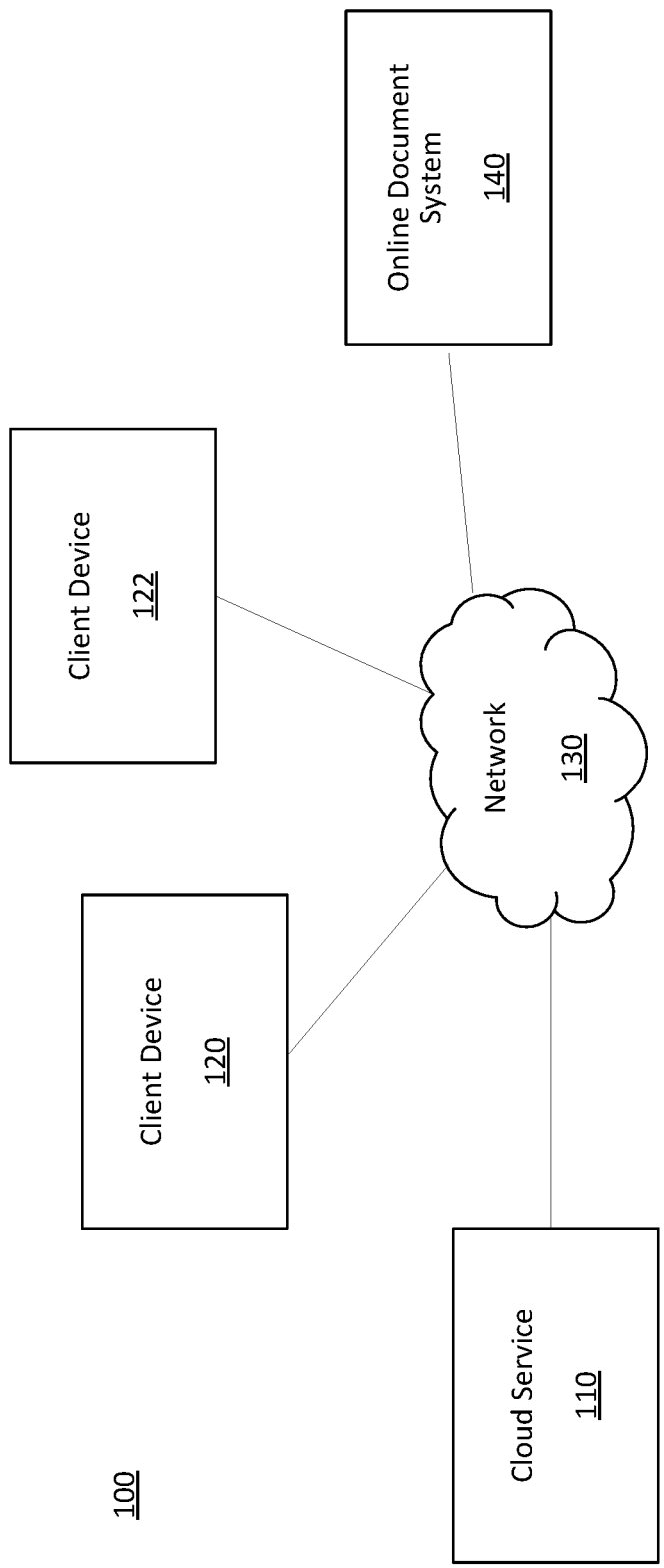
FIG. 1 is a block diagram of a system environment in which an online document system operates in accordance with an embodiment.

Figure (FIG. 1 is a block diagram of a system environment 100 in which an online document system 140 operates in accordance with an embodiment. The system environment 100 illustrated in FIG. 1 includes a cloud service 110, one or more client devices 120, 122, a network 130, an online document system 140. The system environment 100 may have alternative configurations than shown in FIG. 1, including for example, different, fewer, or additional components.

The system environment 100 described herein can be implemented within an online document system, a document execution system, or any type of digital transaction management platform. It should be noted that although description may be limited in certain context to a particular environment, this is for the purposes of simplicity only, and in practice the principles described herein can apply more broadly to the context of any digital transaction management platform. Examples can include but are not limited to online signature systems, online workflow management systems, multi-party communication and interaction platforms, social networking systems, marketplace and financial transaction management systems, or any suitable digital transaction management platform.

In some embodiments, one client device 120 may be associated with a supplier entity, and another client device 122 may be associated with a signing entity. The supplier entity initiates a request associated with an online document to be completed by the signing entity. The supplier entity may be an individual, an organization, a company, an account, and the like. The supplier entity may be an administrator of the online document, which may be a person who created the online document and/or who has authority to administer the online document by changing contents of the online document, grant or deny rights to access the online document, place restrictions on, select tasks to be performed to complete the request with respect to the online document, or send the online document to one or more signing entities. The supplier entity may use features of the online document system 140 to communicate the requests or to otherwise coordinate online document activities with the signing entities.

A request associated with an online document may include one or more requirements to be completed by the signing entity by performing tasks such as opening the online document, reviewing contents of the online document, editing the contents of the online document, signing the online document, forwarding the online document to another user, performing identity verification, providing attachments, completing input fields of the online document, or other interactions with the online document. The tasks may be specified by the supplier entity by configuring fields to be completed by the signing entity within the online document. For example, the supplier entity may add signature blocks, input fields for textual input, and input field for receiving attachments (e.g., images, spreadsheets, documents) in the online document to be filled in by the signing entity.

In some embodiments, the online document included in the request may be associated with a document type. For example, the online document may be an offer letter for a particular signing entity "John Smith" and the document type may "offer letter." The document type may be associated with one or more rules defined by the supplier entity sending online documents of the document type. Each rule may identify a set of conditions and a set of actions (also referred to as "post-completion actions" herein) to be taken after a document of the document type is signed or after other requirements associated with the document type are completed.

The signing entity receives a request from a supplier entity to complete one or more requirements associated with an online document in the request. The signing entity may be any entity that receives, reviews, executes, or performs other tasks with respect to an online document. The signing entity may be an individual, an organization, a company, an account, and the like.

The supplier entity and the signing entity may communicate via client devices 120, 122 that are capable of receiving user input as well as transmitting and/or receiving data via the network 130. A client device may refer to a conventional computer system, such as a desktop or a laptop computer. Alternatively, the client device may be a device having computer functionality, such as a personal digital assistant (PDA), a mobile telephone, a smartphone, or another suitable device. The client device is configured to communicate with the online document system 140 and the cloud service 110 via the network 130, for example using a native application executed by the computing device and provides functionality of the online document system 140, or through an application programming interface (API) running on a native operating system of the computing device, such as IOS® or ANDROID™. A typical client device includes the hardware and software needed to input and output sound (e.g., speakers and microphone) and images, connect to the network 130 (e.g., via Wifi and/or 4G or other wireless telecommunication standards), determine the current geographic location of the client devices (e.g., a Global Positioning System (GPS) unit), and/or detect motion of the client devices (e.g., via motion sensors such as accelerometers and gyroscopes).

The cloud service 110 is configured to provide storage services to the supplier entity and/or signing entity. For example, the cloud service 110 may be an email provider, document software provider, security entities, databases, accounting or financial entities, marketing providers, messaging or communication providers, social networks, image processing or storage entities, file storage providers, credential management providers, device management entities, and the like. The cloud service 110 is associated with a computing device (e.g., a server, a cloud computer) to communicate with one or more of the client devices 120, 122 associated with the supplier entity and/or the signing entity and the online document system 140.

The client devices 120, 122, the online document system 140, and the cloud service 110 are configured to communicate via the network 130, which may comprise combination of local area and/or wide area networks, using wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocols (FTP, SFTP or FTPS). Data exchanged over the network 130 may be represented using any suitable format, such as hypertext markup language (HTML) JavaScript, Object Notation (JSON) or extensible markup language (XML). In some embodiments, all or some of the communication links of the network 130 may be encrypted using any suitable technique or techniques.

In some embodiments, the online document system 140 provides additional document storage or processing features to supplier entities, signing entities, and/or other users. For example, the online document system 140 may provide secure document service features such as creation, verification, rights management, storage, circulation, action management, and other functionalities associated with online documents. As another example, the online document system 140 may also provide automatic content load and orchestration service that allows a user (e.g., a supplier entity or a signing entity, or any user) to upload files stored locally on the client devices 120, 122 or remotely at the cloud service 110 thereto, and cause the online document system 140 to automatically process the files through a plurality of channels. Further details of online document system 140 are discussed below with respect to FIG. 2.

Online Document System

Figure 2:
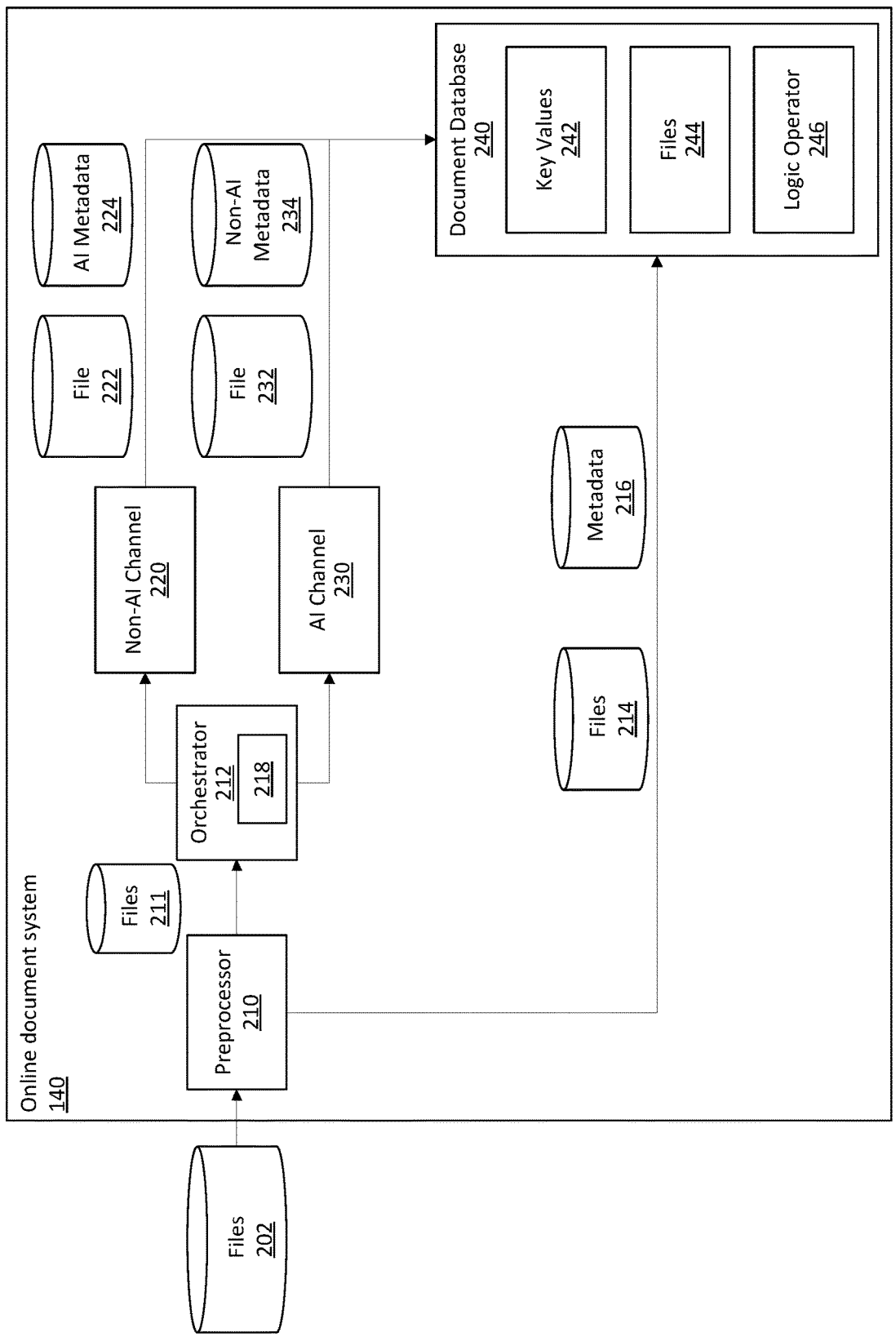
FIG. 2 is a block diagram of an online document system in accordance with an embodiment.

FIG. 2 is a block diagram of an online document system 140 in accordance with an embodiment. The online document system 140 receives instructions from the client device 120 of a user. Responsive to receiving the instructions, the online document system 140 retrieves a set of files 202 from one or more source locations (interchangeably referred to in the singular as "the source location"). In some embodiments, the source location may be a storage that is local to the client device 120. In some embodiments, the source location may be a storage that is remote to the client device 120. For example, the storage may be a storage provided by the cloud service 110. Retrieving the set of files 202 may be performed via a user interface and/or an application programming interface (API) provided by the cloud service 110 and/or the online document system 140.

In some embodiments, the online document system 140 may be configured to provide a web service that allows users to upload files via a browser. The web service may be lightweight, providing user group permission controls, a total number of file quantity limit, a maximum single file size limit, internal and external APIs, and/or integrated metadata file load. In some embodiments, the online document system 140 may be provided as onboarding for a local or network file system. Such a file system may be heavier weight compared to the web service, providing local client application, user authentication, user group permission control, unlimited file quantity, unlimited total volume, and/or internal and/or external APIs.

In some embodiments, the online document system 140 may further be configured to provide an admin experience for administrators of organizational users. Administrators may be allowed to create attribute (or key value) load templates for the document system 140 to generate or store attributes or key values from processing files.

In some embodiments, the online document system 140 is further configured to provide a monitoring experience to administrators. In some embodiments, the online document system 140 is configured to provide an application programming interface and/or a graphical user interface, generating and display flows, heatmaps, and/or configurable features of the document processing. In some embodiments, a headless architecture is implemented. In some embodiments, the headless architecture adds a layer between end user, a content management system, and/or the online document system 140.

In some embodiments, the graphical user interface includes a dashboard that provides both graphical and exportable tabular reporting of activity within and historically through the pipelines. In some embodiments, content of the dashboard is security trimmed against the user profile. For example, an administrator is allowed to review more sensitive data, and a file clerk is allowed to review basic information. In some embodiments, the dashboard also provides interactive elements. In some embodiments, an interactive element may prompt a user to input certain data that the online document system 140 needs to continue processing a file, e.g., a password for secured files. In some embodiments, the user is also able to discontinue the processing of a document via the interactive element.

In some embodiments, the online document system 140 is further configured to generate notifications, such as document processing started, in progress, completed, or statistics associated with document processing. In some embodiments, the notifications may be customized by users. In some embodiments, the online document system 140 is further configured to allow users to export data, such as key values, field attribute values, and statistics associated with document processing. The key values and/or field attribute values may be defined by a user or by the online document system 140, such as person names, dates, email addresses, street addresses, etc.

The online document system 140 includes a preprocessor 210, an orchestrator 212, a plurality of channels 220, 230 (also referred to as pipelines or workflows), and a document database 240. The preprocessor 210 is configured to preprocess files 202 retrieved from the cloud service 110. In some embodiments, the preprocessor 210 is configured to first check all the retrieved files including binaries and structured metadata files to determine whether there are viruses or malicious code contained therein.

Responsive to determining that there are no viruses or malicious code, the preprocessor 210 classifies the set of files into at least two categories. Files in a first category are to be sent to the orchestrator 212 for further process, and files in a second category and their metadata 216 are simply stored in the document database 240. For example, a subset of files 214 in the set of files 202 are categorized in the second category; thus, the subset of file 214 and its metadata 216 are not further processed, and they are simply stored in the document database 240. The second category of files may include (but are not limited to) spreadsheets, password-protected files, encrypted files, and/or files that are specified by a user not to be further processed. In some embodiments, there may be a portion of storage 244 in the document database 240 allocated for storing files that are processed and/or not processed by the orchestrator 212. On the other hand, a subset of files 211 in the set of files 202 are categorized in the first category, and they are further processed by the orchestrator 212. Additional details about the preprocessor 210 are further discussed below with respect to FIG. 3.

The orchestrator 212 is configured to further categorize the subset of files 211 into a plurality of sub-categories. The plurality of sub-categories corresponds to a plurality of channels 220, 230. Each of the plurality of channels 220, 230 includes a sequence of one or more services configured to process or store the received files.

In some embodiments, different channels 220, 230 are interconnected to form workflows and sub workflows. In some embodiments, workflow decision branches and subflow are driven from data harvested from the source metadata of the files, files attributes, and/or pipeline service outputs. For example, a decision for a file to go through a particular workflow for OCR may be decided based on (Multipurpose Internet Mail Extensions) type, file size, and/or that the file was manually loaded through the upload center web service. A MIME type is a two-part identifier for file formats and format contents transmitted on the internet. For example, an HTML file might be designated as "text/html; charset=UTF-8."

In some embodiments, services can be added and sequenced in a workflow, and a workflow decision point can be configured to ensure the pipeline operates in line with a user's use case. For example, an image file loaded through an upload center web service may have a higher priority in the pipeline over an image file bulk loaded through an API.

In some embodiments, users are allowed to configure services and workflow decisions differently depending on the use case. For example, a human resource department may need to process a large number of employer-employee agreements and prioritize files differently to a procurement department that may need to process a large number of invoices and purchase orders.

In some embodiments, the orchestrator 212 further includes a monitor 218 configured to monitor workload and/or processing speed of each of the plurality of channels 220, 230. Responsive to workload and/or processing speed of a particular channel is significantly lower than other channels, the orchestrator 212 may scale up or down the particular channel. For example, the orchestrator 212 sends a first number of a first type of files to a first channel 220, and a second number of a second type of files to a second channel 230. After a time frame (e.g., one hour, 24 hours, or any time frame which may be set by a user or by the online document system 140), the monitor 218 may find that the first channel 220 has processed 10% of the first number of the first type of files, and the second channel 230 has processed 50% of the second number of the second type of files. Alternatively, or in addition, the orchestrator 212 is data driven. For example, the orchestrator 212 may determine that a document contains hundreds or thousands of pages and/or complex data, such as tabular data, and estimate a runtime and/or computing resources required to process such a document in a timely manner.

The monitor 218 may determine that the first channel 220 needs to be scaled up, and the second channel 230 needs to be scaled down, such that the processing speed of the two channels 220, 230 will be comparable, and all the first number of files of the first type and the second number of files of the second type will be finished processing by both channels 220, 230 at around the same time.

In some embodiments, the orchestrator 212 may further divide a same category of files based on their sizes and/or contents. For example, small-sized files may be processed first, medium-sized files may then be processed, and large-sized files may be processed last. As another example, files containing or not containing tabular data may be processed in a particular order. In some embodiments, when a file size is greater than a predetermined threshold, the preprocessor 210 is configured to prevent the file to be further processed, or divide the file into a plurality of smaller files.

In some embodiments, scaling up a particular channel includes allocating additional hardware resources to the particular channel, causing the particular channel to have a greater processing power. On the other hand, scaling down a particular channel includes allocating less hardware resources to the particular channel, causing the particular channel to have a lower processing power. Allocating more or less hardware resources may be implemented as allocating more or less number of hardware processors, different types of processors, and/or allocating more or less processing times of the same number of processors. In some embodiments, scaling up a particular channel includes adding one or more new channels that perform the same services as the particular channel, allowing multiple channels (e.g., the new channel(s) and the particular channel) to simultaneously process a same category of files.

In some embodiments, the monitor 218 is configured to monitor each of the plurality of services in each channel to identify a workload and/or a processing speed of each service. The online document system 140 is configured to scale up or down a particular service. For example, an OCR processing service may be the service that is the slowest relative to the rest of the services in one or more channels 220, 230. Responsive to determining that the OCR processing service is the slowest relative to the rest of the services in the channels 220, 230, the online document system 140 may be configured to scale up the OCR processing service.

In some embodiments, the online document system 140 is configured to perform predictive scaling based on information associated with the set of files 202 (e.g., statistics or metadata of the set of files 202). In some embodiments, the predictive scaling is performed by a pretrained machine learning model configured to receive input features associated with the set of files and output information indicating a required scale of each service or channel. The machine learning model may be trained based on historical processing data including information associated with a plurality of sets of files, scales of services or channels used, and/or throughputs of the channels. In some embodiments, the online document system 140 also allows a user to input their processing preference, such as priorities of different types of files, prioritize accuracy or speed, etc. The pretrained machine learning model also takes the user preferences as input when generating predictive scaling.

Notably, different batches of files from different users contain a different mixture of files. The principles described herein provide a self-scaling orchestration pipeline that automatically manages synchronous and asynchronous execution of services sequenced by the workflow for both binary files and structured metadata packages. As such, from the users' point of view, the online document system 140 provides customized scales of different processing channels based on specific batch of files provided by users, and automatically orchestrates different types of files to the different processing channels, significantly improving user experience.

In some embodiments, the plurality of channels 220, 230 includes at least a non-AI channel 220, and an AI channel 230. The AI channel 230 includes at least one AI-based service, and AI channel 220 does not include AI-based services. Files in a first sub-category are further processed by the non-AI channel 220, and files in a second sub-category are further processed by the AI channel 230. For example, a subset of files 222 are in the first sub-category, and they are further processed by the non-AI channel 220. On the other hand, a subset of files 232 are in the second sub-category, and they are further processed by the AI channel 230. The non-AI channel 220 may include a plurality of channels.

In some embodiments, the AI channel 230 includes one or more pre-trained AI models configured to derive key values and/or field attribute values based on respective processing of subsets of files 232. In some embodiments, the key values and/or field attribute values are stored as additional metadata 234 for the files 232. The AI channel 230 may include a plurality of AI channels. Additional details about the AI channel 230 are further discussed below with respect to FIGS. 4-5.

In some embodiments, some of the pre-trained AI models are provided by the online document system 140. In some embodiments, some of the pre-trained AI models are provided by users, or fine-tuned by users' training data. For example, a first user may have a large volume of invoice documents in particular formats, and a first pre-trained AI model may be trained to extract particular key value pairs in those invoice documents. As another example, a second user may have a large volume of legal documents in particular formats, and a second pre-trained AI models may be trained to extract particular key value pairs in those legal documents.

In some embodiments, users can select from a plurality of AI models and a plurality of services to assemble their own document processing channels. In some embodiments, the online document system 140 is configured to suggest one or more processing channels including different services and AI models based on the retrieved documents, and users can then accept the suggestions or modify the suggested processing channels before accepting them.

In some embodiments, the extracted key value pairs may then be stored as metadata 234 of their corresponding files. The files 222, 232 and their respective metadata 224, 234 are then stored in the document database 240. In some embodiments, the document database 240 allocates a portion of storage 242 for storing key values and/or field attribute values. In some embodiments, the key values and/or field attribute values and the files are relationally stored in the document database 240, such that when a file stored in the portion of storage 244 is accessed, key values and/or field and/or attribute values associated with the file can also be easily retrieved from the portion of storage 242, and that when a key value and/or field attribute values stored in the portion of storage 242 is accessed, the file associated thereof can also be easily retrieved from the portion of storage 244.

After the key values and/or field attribute values are generated and stored in a data structure (such as a database), the key values and/or field attribute values and/or the documents can then be published for further logic operations. In some embodiments, the document database 240 also includes a logic operator 246 configured to allow users to perform logic operations on key values and/or field attribute values stored in the portion of storage 242. The logic operator 246 is configured to receive an input to execute logic relating to the files stored in the document database 240, determines that the input is associated with one or more of the key values and/or field attribute values, retrieves the one or more of the key values and/or field attribute values stored in the portion of storage 242, and executes the logic using the one or more retrieved key values and/or or field attribute values.

In some embodiments, the online document system 140 provides a set of available keys, fields, and/or attributes for the user to select. In some embodiments, users can create their own keys, fields, and/or attributes for the online document system 140 to map data values thereto. In some embodiments, a user can define a field having one or more attributes. For example, an address field may include a plurality of attributes, e.g., street number, street, state, zip code, and country.

Figure 3:
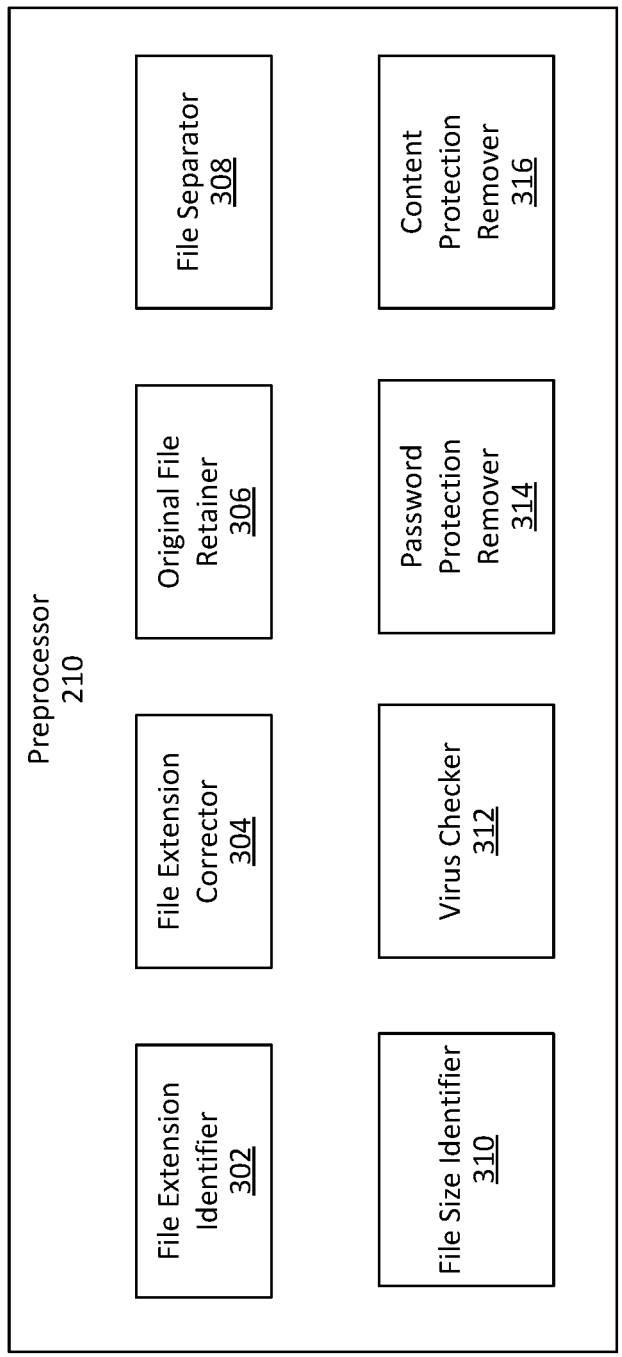
FIG. 3 is a block diagram of a preprocessor of an online document system configured to preprocess each retrieved file in accordance with an embodiment.

FIG. 3 is a block diagram of a preprocessor 210 in accordance with an embodiment. In some embodiments, the preprocessor 210 includes a file extension identifier 302, a file extension corrector 304, an original file retainer 306, a file separator 308, a file size identifier 310, a virus checker 312, a password protection remover 314, and/or a content protection remover 316.

The virus checker 312 is configured to check all the files, including binaries and structured metadata files to detect and/or remove viruses and other kinds of malicious code from the files. Such viruses and malicious code may include (but are not limited to) spyware configured to steal sensitive information, ransomware used by malicious entities for extorting money, worms configured to spread copies between computers, trojans configured to promise one action but deliver another action, etc. In some embodiments, responsive to detecting viruses or malicious code from the files 202 injected from a cloud service 110, the online document system 140 stops further processing the infected files. In some embodiments, the online document system 140 further generates a notification, notifying a user the detection of the viruses or malicious code, or failure of processing the infected files. In some embodiments, the online document system 140 further generates telemetry data and/or logs recording the viruses or malicious code and the infected files.

The file extension identifier 302 is configured to identify an extension of each file to determine a file type of the file. The file extension corrector 304 is configured to compare a file extension based on media type or MIME (Multipurpose Internet Mail Extensions) type. The file extension corrector 304 may compare the file extension of a file with its MIME type. When the file extension is inconsistent with the MIME type, the file extension corrector 304 may correct the file extension based on the MIME type.

The original file retainer 306 is configured to retain a copy of the original files, such that when a file is corrupted or inadvertently modified during processing, the online document system 140 can go back to the copy of the original file. Further, some of the files are composite files that embed additional files therein, such as ZIP files, or files embedded in a document, such as object linking and embedding (OLE) files. The file separator 308 is configured to separate the embedded or nested files from the composite files, and the original file retainer 306 is configured to retain an original copy of the composite files. For each OLE file, there may be a hierarchical structure of multiple files contained therein. In some cases, only child files are processed, and in some cases only a parent file is processed. The child files, parent files, and/or referential integrity of the parent/child files are also retained. In some embodiments, the online document system 140 includes logic, when executed, the logic determines whether child files, parent files, and/or both child, parent files are to be processed depending on the properties of the files, balancing processing times and resource consumption, and further enabling scalability where unprocessed files are retained in case they are needed in downstream processing.

The file size identifier 310 is configured to identify a size of each file. In some embodiments, when the file size of a file is greater than a threshold, the preprocessor 210 merely retains a copy of the file and does not perform further process, such that processing of other files is not delayed. Alternatively or in addition, the files with sizes greater than the threshold are not processed sequentially. Instead, they are processed later after the smaller-sized files are processed, or when the processing resource of the online document system 140 has a sufficient extra bandwidth. Alternatively, the files with sizes greater than the threshold are divided into a plurality of smaller files that have sizes less than the threshold, and the divided smaller files are then processed through a selected channel. Alternatively, files greater than a threshold may be flagged, and a data driven decision can be made, such as delete, store no processing, process, or delayed process, etc.

In some embodiments, the preprocessor 210 also allows users to configure blocked file types or file sizes. For example, a user can specify a particular type of file or a particular file extension, or a file size threshold, such that the particular type of files or files with the particular file extension or files with size greater than the threshold are blocked and not injected into the online document system 140. In some embodiments, a file corpus is reconciled with what is processed and what isn't. In some embodiments, processed files or not processed files are flagged to indicate their processing status.

Some files are password protected or encrypted, such as some ZIP files or PDF files. A user may be allowed to configure whether password-protected files are to be further processed. The password protection remover 314 is configured to remove the password from a password-protected file. The content protection remover 316 is configured to decrypt an encrypted file. In some embodiments, the preprocessor 210 is configured to identify a password-protected file or an encrypted file. In some embodiments, responsive to such a detection, the preprocessor 210 generates a notification, asking a user whether the password-protected file or the encrypted file is to be further processed by the online document system 140 or prompt the user to enter a password. If the user indicates that these files are to be further processed, and/or enters a password or decryption key for accessing or decrypting the file, the password protection remover 314 and/or the content protection remover 316 is configured to remove the passport of the file and/or decrypt the file.

In some embodiments, when the user opted out of further processing the password-protected files and/or encrypted files, or the password provided by the user is incorrect, the online document system 140 is configured to continue to save the file in a storage (e.g., a blob store) configured to store unstructured data.

Figure 4:
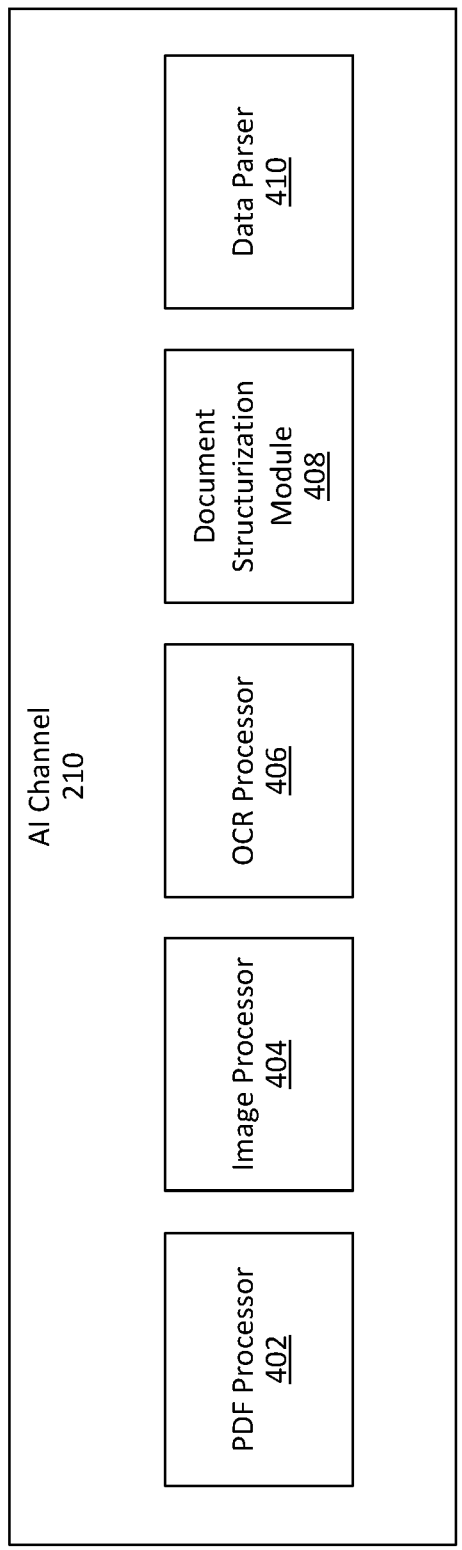
FIG. 4 illustrates a block diagram of an AI channel configured to process a category of files in accordance with an embodiment.

FIG. 4 illustrates a block diagram of an AI channel 230 in accordance with an embodiment. The AI channel 230 includes a PDF processor 402, an image processor 404, an OCR processor 406, a document structurization module 408, and a data parser 410. The PDF processor 402 is configured to extract images from PDF files. The image processor 404 is configured to process image files or images extracted from the PDF files.

In some embodiments, the image processor 404 is configured to perform scaling, cropping, clipping, rotation, and/or noise removal on the images. In some embodiments, the image processor 404 is also configured to detect a page orientation, and rotate the image (e.g., 90 degrees, 180 degrees, 270 degrees) to its proper orientation. In some embodiments, the image processor 404 is also configured to detect skewing of images, and perform de-skewing of the images up to a predetermined angle, such as +/−20 degrees. In some embodiments, the image processor 404 is further configured to detect specks or noise, and perform despeckling on the images to clean up the images. In some embodiments, the image processor 404 is further configured to detect blurry images and perform blur correction to sharpen the blurry images. In some embodiments, the image processor 404 is configured to perform texture filtering or adaptive binarization on images. In some embodiments, the image processor 404 is configured to perform despeckling, texture filtering and/or adaptive binarization in portions or blocks of images. In some embodiments, the image processor 404 is further configured to adjust colors of text and/or background in images. In some embodiments, the image processor 404 is configured to identify borders and frames in images.

The OCR processor 406 is configured to identify characters based on the processed images. In some embodiments, the OCR processor 406 is configured to identify characters of a plurality of languages, including European languages (e.g., Germanic, Latin, Cyrillic, Armenian, Greek alphabets, etc.), and non-European languages (e.g., Chinese, Japanese, Korean, Arabic, Farsi, Thai, Vietnamese, Hebrew, etc.). In some embodiments, the OCR processor 406 is configured to identify characters of more than 200 languages. In some embodiments, the OCR processor 406 is also configured to perform intelligent character recognition (ICR), which is a technology for recognizing text, fonts, and styles of handwritings characters. In some embodiments, the OCR processor 406 is configured to identify a plurality of regional styles of handwriting or hand-printing, and recognize hand-printed characters in fields and frames. In some embodiments, the OCR processor 406 is configured to identify more than 20 regional styles of hand-printing.

In some embodiments, the OCR/ICR speed and accuracy may be tuned based on the needs of the application. Generally, the speed and accuracy of OCR/ICR are tradeoffs for the OCR processor 406. A greater accuracy corresponds to a lower speed. In some embodiments, the OCR processor 406 may allow users to adjust the speed or accuracy metrics based on the user preference. In some embodiments, the OCR processor 406 may allow users to turn on or off certain languages, regional styles and/or special fields to improve speed or accuracy of the performance.

In some embodiments, the OCR processor 406 is also configured to process the characters identified to identify terms in dictionaries of different languages. In some embodiments, the OCR processor 406 is further configured to identify terms in a special context dictionary of a particular field, such as legal field, technical field, business field, etc.

The document structurization module 408 is configured to identify structures of a document processed by the OCR processor 406. In some embodiments, document structurization module 408 identifies a logical structure, elements, and formatting of a document, including (but not limited to) heading hierarchical structure, table of contents, captions to images, tables, diagrams, headers and footers, section elements, paragraph elements, sentence elements, page numbering, logical text flow across pages for elements, retention of hyperlinks, etc. In some embodiments, the document structurization module 408 is configured to export the structure of the document to a descriptive file, such as an XML file or an XHTML file. Additional details about the document structurization are further discussed below with respect to FIG. 5.

The data parser 410 is configured to parse the structurized document to extract cognitive data. In some embodiments, the data parser 410 includes a data mapper configured to map key value pairs from the structurized document. In some embodiments, the data parser 410 is further configured to detect tables including structured row-column information. The data parser 410 is configured to identify key value pairs from the rows or columns of the tables. In some embodiments, the data parser 410 is configured to export tables to one or more structured files or data structures, such as (but not limited to) CSV, excel, and/or JSON files. In some embodiments, the data parser 410 is further configured to detect bad tables, such as tables with white spaces, or unintelligible words, etc. In some embodiments, the bad tables may be automatically discarded. Additional details about the data parser 410 are further discussed below with respect to FIG. 6.

Figure 5:
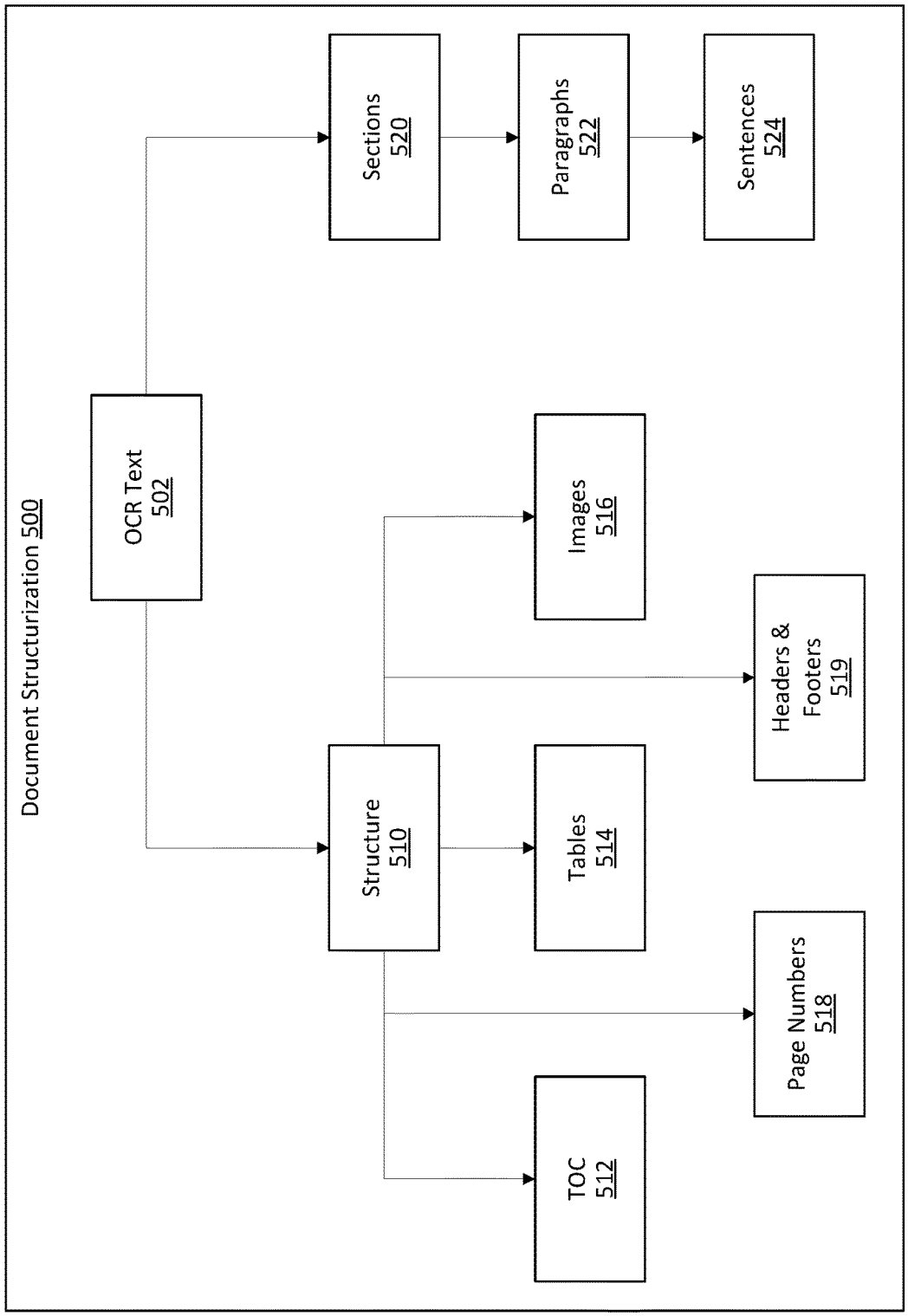
FIG. 5 illustrates a block diagram of document structurization configured to identify structures of a document in accordance with an embodiment.

FIG. 5 illustrates a block diagram of document structurization 500 in accordance with an embodiment. The document structurization 500 may be performed by the document structurization module 408 of FIG. 4. The document structurization module 408 takes OCR text generated by the OCR processor 406 as input to identify a structure 510 and one or more sections 520 of a document. The structure 510 may include (but are not limited to) a table of content (TOC) 512, one or more tables 514, one or more images 516, one or more page numbers 518, and/or headers and/or footers 519. The document may include one or more sections 520, each of which may further include one or more paragraphs 522, and each of which may further include one or more sentences 524.

Some documents are simpler, and some documents are more complex. Different document structurization module 408 may be implemented to process different types of documents with different complexity. For example, in some embodiments, some simple documents can be defined by fixed document definitions, such as standardized cell-based forms with regulated restricted content. In some embodiments, some fairly simple documents can be defined by flexible definitions, such as documents with a standard format, however, document sections may vary in size and include multiple elements. A simplified structurization process may be implemented to process these type of documents. In some embodiments, some complex documents may contain both standardized cells and different elements, such as standard normal full text documents. These documents would require a full-functioned structurization module 408.

Figure 6:
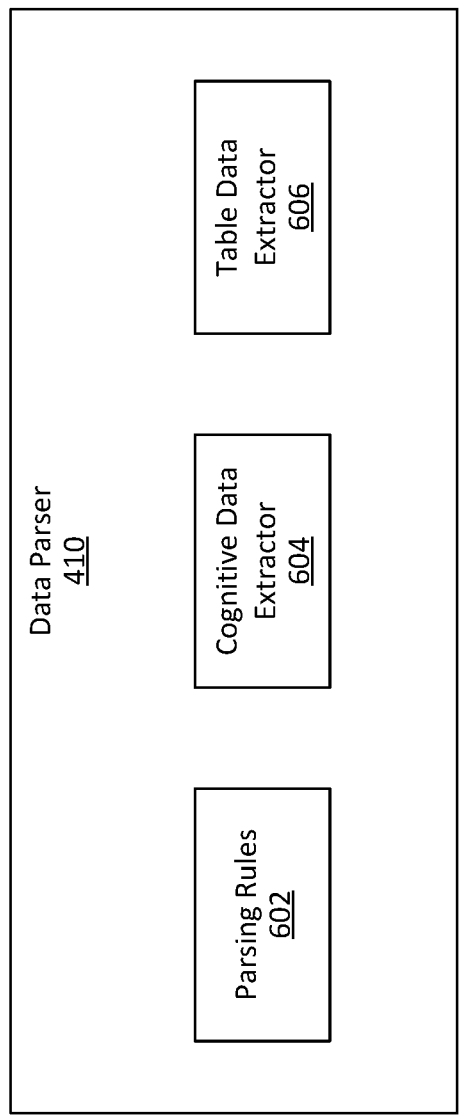
FIG. 6 illustrates a block diagram of a data parser configured to parse data contained in a structurized document in accordance with an embodiment.

FIG. 6 illustrates a block diagram of a data parser 410 in accordance with an embodiment. In some embodiments, the data parser 410 includes one or more parsing rules 602, a cognitive data extractor 604, and a table data extractor 606. The one or more parsing rules 502 may be customized by users or set by the online document system 140. The parsing rules 502 defines what type of data is to be extracted from the documents, such as (but not limited to) dates, numbers, person names, postal addresses, phone numbers, email addresses, table data, text at fixed position, and/or text with a variable position based on one or more anchor keywords, etc. The cognitive data extractor 604 and the table data extractor 606 are configured to extract data from documents based on the one or more parsing rules 602. In some embodiments, the cognitive data extractor 604 implements one or more machine learning models, such as neural networks, to generate candidate key value pairs, and choose the most suitable key value pairs based on their confidence scores. The table data extractor 606 is configured to identify tables in documents, and extract key value pairs based on data contained in the tables. In some embodiments, the data parser 410 may be configured to prompt the user to inspect certain key value pairs, which may be the key value pairs with confidence scores lower than a threshold. The data parser 410 may also direct the user to a relevant area of the document such that the user can confirm or modify the textual data of the document.

In some embodiments, users are allowed to define a document model to identify, capture, and/or extract with a defined text box, a tick box, a signature, a barcode, a non-redacted option value and/or a circled option value. The data types and validation can also be defined by the users, such as text, number, date, list, etc. The document model can then be applied to files based on a predefined logic (e.g., metadata logic), which may be provided by the online document system 140 or configured by users. In some embodiments, users may be allowed to manually change and/or select a document model for a file and process (or reprocess) the file.

In some embodiments, users are allowed to define mandatory and/or optional capture components and extraction validation, where the extraction validation is a process to check whether the captured component is valid. For example, a captured date, phone number, or address needs to have a particular format. If the format is valid, the extraction validation would consider it as a valid value. In some embodiments, the online document system 140 is further configured to perform process validation, which is a process configured to check the captured content against preset rules and criteria. For example, if a date of birth of an employee is earlier than 1900, the data value may be deemed invalid. In some embodiments, the failed values and/or the documents associated therewith are flagged for manual validation. In some embodiments, users are allowed to overwrite the values that failed the extraction validation and/or process validation with correct values. In some embodiments, users are allowed to create or edit validation rules and/or criteria.

In some embodiments, the online document system 140 provides a library of common pattern matching extraction models that cannot be modified or deleted by users. In some embodiments, users can copy and modify a standard pattern to create a new custom pattern. In some embodiments, users can create a new custom pattern from scratch defining a new attribute or assigning an existing attribute. In some embodiments, when defining a new pattern, the user is required to enter a pattern name, a data type (e.g., text, string, integer, number, date, etc.), single or multi-value, a default value or non, and/or a usage scope, such as which document structure elements can the pattern be used, match in existing attribute value, and/or match a value from model extraction.

Computing Machine Architecture

Figure 7:
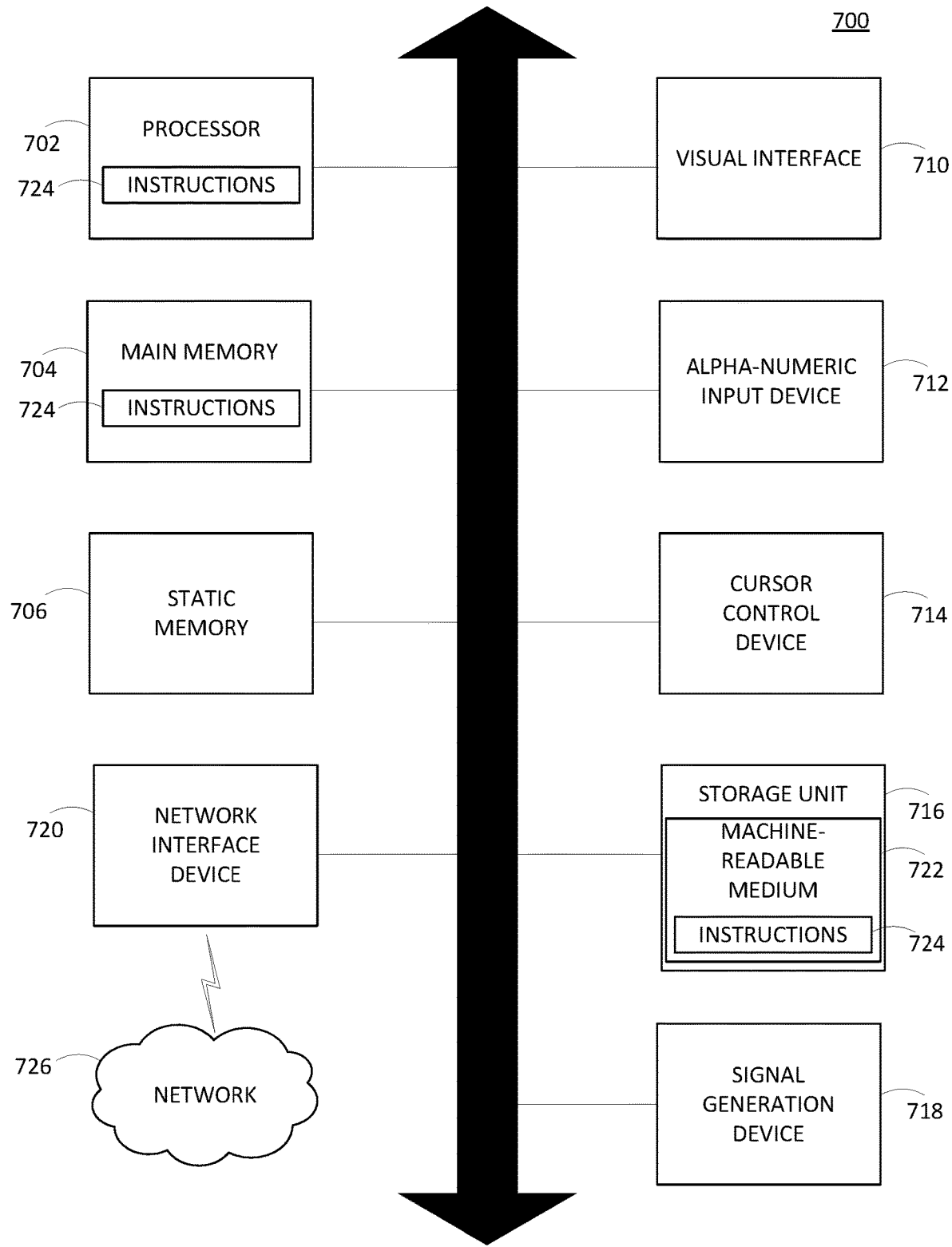
FIG. 7 is a block diagram illustrating a computer system for use in providing an online document system, in accordance with an embodiment.

FIG. 7 is a block diagram illustrating a computer system 700 for use in managing actions, in accordance with an embodiment. The computer system 700 is able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may be comprised of instructions 724 executable by one or more processors 702. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein. Any client device or service disclosed herein may use some or all functionality described with respect to the machine.

The example computer system 700 includes a processor 702 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 704, and a static memory 706, which are configured to communicate with each other via a bus 708. The computer system 700 may further include visual display interface 710. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 700 may also include alphanumeric input device 712 (e.g., a keyboard or touch screen keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Process of Automatic Content Upload and Process

FIG. 8 is a flowchart illustrating a process 800 for automatic content upload and process. In various embodiments, the process 800 includes different or additional steps than those described in conjunction with FIG. 8. Further, in some embodiments, the steps of the process may be performed in different orders than the order described in conjunction with FIG. 8. The process 800 described in conjunction with FIG. 8 may be carried out by the online document system 140 in various embodiments, while in other embodiments, the steps of the process 800 are performed by any online system capable of retrieving and processing files.

The online document system 140 is configured to retrieve 805 a set of files (e.g., a set of files 202 in FIG. 2) from a source location based on instructions received from a client device of a user (e.g., client device 120). In some embodiments, the set of files are stored locally on the client device of the user. In some embodiments, the set of files are stored in a cloud storage (e.g., a local storage on client device 120) associated with the user. When the set of files are stored locally on the client device of the user, the client device is configured to transmit the set of files to the online document system 140. When the set of files are stored in a cloud storage (e.g., cloud service 110) associated with the user, the client device sends a path of the cloud storage and instructions (such as credentials of the cloud storage) to the online document system 140, allowing the online document system 140 to retrieve the set of documents stored in the cloud storage.

In some embodiments, a headless architecture is implemented. The headless architecture enables file upload by any front-end channel or external process/system via API and provides a better user experience. In particular, the headless architecture provides the flexibility to design the front-end for document upload via different channels, as opposed to non-headless architecture that generally only allows the front end technology provided by the content management system platforms.

The online document system 140 then classifies 810 the set of files into a plurality of categories corresponding to a plurality of channels (e.g., channels 220, 230 of FIG. 2), which may include an AI channel (e.g., AI channel 230) and a non-AI channel (e.g., non-AI channel 220). Each of the plurality of channels includes a sequence of one or more services (e.g., services 402, 404, 406, 408, 410 of FIG. 4) configured to process or store files. For example, in some embodiments, the AI channel includes a PDF processor 402, an image processor, an OCR processor, a document structurization module, and/or a data parser. The PDF processor is configured to process PDF files, and the image processor is configured to process image files or images extracted from the PDF files. For example, in some embodiments, the image processor is configured to perform scaling, cropping, clipping, rotation, de-skewing, despeckling, filtering, and/or other noise removal of the images. The OCR processor is configured to recognize characters from the processed images, where the characters may be in multiple languages. The document structurization module is configured to identify structures of recognized textual data. The data parser is configured to further process the structurized textual data to identify key value or field attribute values.

In some embodiments, the online document system 140 classifies the set of files into at least two categories, namely a first category and a second category. A subset of files in the first category (such as data sheets, excel files) and metadata thereof are simply stored on the online document system 140, and will not be further processed. On the other hand, a subset of files in the second category are further categorized into a plurality of sub-categories. Files in each of the plurality of sub-categories are further processed by one of the plurality of channels.

In some embodiments, classifying the set of files into the plurality of categories further includes identifying an extension of a file in the set of files, and responsive to identifying a particular extension, e.g., ZIP file, separating the file into a plurality of files. The plurality of files may then be classified into the plurality of categories.

In some embodiments, classifying the set of files into the plurality of categories further includes identifying a size of a file in the set of files, and responsive to identifying that the size of the file is greater than a threshold, preventing the file from being further processed or delaying further processing of the file to a later time.

In some embodiments, classifying the set of files into the plurality of categories further includes identifying that a file in the set of files is password protected or encrypted, and responsive to identifying that the file is password protected or encrypted, obtaining a password or decryption key, and removing the password from the file or decrypting the file based on the password or decryption key. In some embodiments, the online document system 140 prompts a user to enter a password or decryption key, which may or may not be the correct password or decryption key. In some embodiments, when no correct password or decryption key is received, the online document system 140 stores the password protected or encrypted file in a storage (e.g., a blob storage) configured to store unstructured data.

The online document system 140 then processes subsets of files by different ones of the channels to derive key values, and stores 815 the key values in a data structure. The key values may be derived based on a set of rules, which may be preset by the online document system 140, and/or configured by a user of the online document system 140. In some embodiments, the set of rules includes rules to derive particular types of data from the files, such as (but not limited to) dates, numbers, person names, postal addresses, phone numbers, email addresses, table data, text at fixed position, and/or text with a variable position based on one or more anchor keywords, etc.

The online document system 140 may then receive 820 an input to execute logic relating to the set of files. For example, a user may be allowed to query the key values to obtain interesting data, such as a person's phone number or email address, a date of a document, etc. Responsive to receiving the input, the online document system 140 may determine 825 that the input is associated with the one or more keys or key values, retrieve 830 one or more of the key values, and executes 835 the logic using the one or more retrieved key values.

In some embodiments, the online document system 140 is further configured to monitor workload or processing speed of each of the plurality of channels or each service in the channels, and automatically scale up or scale down a particular channel in the plurality of channels or a particular service in the channels based in part on the workload or the processing speed of the particular channel or service.

In some embodiments, scaling up a particular channel or service includes adding a new channel or a new service that perform same processing as the particular channel or service, such that two channels or services can simultaneously perform the same processing. In some embodiments, scaling up a particular channel or service includes allocating additional hardware resources to the particular channel or service, allowing the particular channel or service to have a greater processing power.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computer system 700 referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
retrieving, using at least one processor, a set of files from a source location based on instructions received from a client device;
classifying, using the at least one processor, the set of files into a plurality of categories corresponding to a plurality of channels, each of the plurality of channels comprising a sequence of one or more services configured to process or store files;
generating, using the at least one processor, a data structure storing key values, the key values derived, using one or more machine learning models, based on respective processing of subsets of files, wherein the subsets of files are processed by different ones of the channels in the plurality of channels, wherein processing of the subset of files includes
receiving one or more input features associated with the subset of files;
predicting, using the one or more machine learning models, based on the one or more input features associated with the subset of files, a scaling associated with at least one of: at least one channel in the plurality of channels and at least one service in the one or more services, the scaling including at least one of a processing workload and a processing speed associated with at least one of: the at least one channel and the at least one service;
processing, based on the predicting, at least one file in the subset of files;
receiving, using the at least one processor, an input to execute logic relating to the set of files;
determining, using the at least one processor, that the input is associated with one or more of the key values;
retrieving, using the at least one processor, the one or more of the key values; and
executing, using the at least one processor, the logic using the one or more retrieved key values.

2. The method of claim 1, further comprising:
monitoring a workload or a processing speed of each of the plurality of channels; and
automatically scaling up a particular channel in the plurality of channels based in part on the workload or the processing speed of the particular channel.

3. The method of claim 2, wherein the scaling up the particular channel includes adding a new channel that performs same processing as the particular channel.

4. The method of claim 2, wherein the scaling up the particular channel includes allocating additional hardware resources to the particular channel.

5. The method of claim 1, wherein the classifying the set of files into the plurality of categories includes:
monitoring the set of files for a particular extension; and
responsive to identifying the particular extension in a given file of the set of files, separating the given file into a plurality of files.

6. The method of claim 1, wherein the classifying the set of files into the plurality of categories includes:
monitoring the set of files for a threshold file size; and
responsive to identifying a given file having at least the threshold file size, preventing the given file from being further processed until a given condition is met or delaying further processing of the given file to a later time.

7. The method of claim 1, wherein the classifying the set of files into the plurality of categories includes:
identifying that a file in the set of files is password protected or encrypted; and
responsive to identifying that the file is password protected or encrypted, obtaining a password or decryption key; and
removing the password or encryption from the file or decrypting the file based on the password or decryption key.

8. The method of claim 1, wherein the plurality of channels includes an artificial intelligence (AI) channel and a non-AI channel, and the one or more services of the AI channel includes an OCR processor configured to recognize text from a PDF file or an image file.

9. The method of claim 8, wherein the AI channel further includes a data extractor configured to:
parse the text recognized by the OCR processor to generate cognitive data having a set of key values; and
generating a data structure storing the set of key values.

10. The method of claim 9, wherein the AI channel further includes a table extractor configured to:
parse the text recognized by the OCR processor to identify a table having a set of key values; and
generate a data structure storing the set of key values.

11. A non-transitory computer-readable medium comprising memory with instructions encoded thereon, the instructions, when executed, causing one or more processors to:
retrieve a set of files from a source location based on instructions received from a client device;
classify the set of files into a plurality of categories corresponding to a plurality of channels, each of the plurality of channels comprising a sequence of one or more services configured to process or store files;
generate a data structure storing key values, the key values derived, using one or more machine learning models, based on respective processing of subsets of files, wherein the subsets of files are processed by different ones of the channels in the plurality of channels, wherein processing of the subset of files includes
receiving one or more input features associated with the subset of files;
predicting, using the one or more machine learning models, based on the one or more input features associated with the subset of files, a scaling associated with at least one of: at least one channel in the plurality of channels and at least one service in the one or more services, the scaling including at least one of a processing workload and a processing speed associated with at least one of: the at least one channel and the at least one service;
processing, based on the predicting, at least one file in the subset of files;
receive an input to execute logic relating to the set of files;
determine that the input is associated with one or more of the key values;
retrieve the one or more of the key values; and
execute the logic using the one or more retrieved key values.

12. The non-transitory computer readable medium of claim 11,
wherein the one or more processors are further configured to monitor a workload of each of the plurality of channels; and
automatically scale up or down a particular channel in the plurality of channels based in part on the workload of the particular channel.

13. The non-transitory computer readable medium of claim 12, wherein scaling up the particular channel includes adding a new channel that performs same processing as the particular channel.

14. The non-transitory computer readable medium of claim 12, wherein scaling up or down the particular channel includes allocating more hardware resources to the particular channel, and allowing the particular channel to have a greater processing power.

15. The non-transitory computer readable medium of claim 11, wherein classifying the set of files into the plurality of categories includes:
   identifying an extension of a file in the set of files; and
   responsive to identifying a particular extension, separating the file into a plurality of files.

16. The non-transitory computer readable medium of claim 11, wherein classifying the set of files into the plurality of categories includes:
   identifying a size of a file in the set of files; and
   responsive to identifying that the size is greater than a threshold, setting the file aside.

17. The non-transitory computer readable medium of claim 11, wherein classifying the set of files into the plurality of categories includes:
   identifying that a file in the set of files is password protected or encrypted; and
   removing the password of the file or decrypting the file.

18. The non-transitory computer readable medium of claim 11, wherein the plurality of channels includes an artificial intelligence (AI) channel and a non-AI channel, and the one or more services of the AI channel includes an OCR processor configured to recognize text from a PDF file or an image file.

19. The non-transitory computer readable medium of claim 18, wherein the AI channel further includes a data extractor configured to:
   parse the text recognized by the OCR processor to generate cognitive data having a set of key values; and
   generating a data structure storing the set of key values.

20. The non-transitory computer readable medium of claim 18, wherein the AI channel further includes a table extractor configured to:
   parse the text recognized by the OCR processor to identify a table having a set of key values; and
   generate a data structure storing the set of key values.

* * * * *